United States Patent [19]

Kawaura

[11] Patent Number: 4,478,396
[45] Date of Patent: Oct. 23, 1984

[54] ELASTIC SUPPORT STRUCTURE OF WHEEL SUSPENSION MECHANISM

[75] Inventor: Takayoshi Kawaura, Tokyo, Japan

[73] Assignee: Nissan Motor Company, Limited, Yokohama, Japan

[21] Appl. No.: 404,868

[22] Filed: Aug. 3, 1982

[30] Foreign Application Priority Data

Oct. 9, 1981 [JP] Japan ................................ 56-161759

[51] Int. Cl.³ ............................................ B60G 11/52
[52] U.S. Cl. ..................................... 267/8 R; 267/153; 267/35; 267/141.1; 267/33; 280/668; 188/321.11
[58] Field of Search ................. 280/668; 267/8 R, 35, 267/153, 152, 141.1, 33; 188/321.11; 248/634, 632; 403/344, 222

[56] References Cited

U.S. PATENT DOCUMENTS

| | | | |
|---|---|---|---|
| 1,890,278 | 12/1932 | Bedur | 403/222 |
| 3,037,787 | 6/1962 | Gottschald | 280/668 |
| 3,096,084 | 7/1963 | Osterhoudt | 267/8 R |
| 3,333,653 | 8/1967 | Eirhart | 280/668 |
| 3,425,757 | 2/1969 | Minor | 403/344 |
| 4,298,193 | 11/1981 | Mourray | 280/668 |

FOREIGN PATENT DOCUMENTS 140607  4/1980  Japan .................................. 280/668

*Primary Examiner*—Bruce H. Stoner, Jr.
*Assistant Examiner*—Alvin E. Oberley

[57] ABSTRACT

An elastic support structure for a wheel suspension mechanism of a wheeled vehicle, comprising a first rigid member to be subjected to shocks and vibrations produced in a tire-and-wheel assembly, a second rigid member to which shocks and vibrations may be transmitted from the first rigid member, the first and second rigid members being movable with respect to each other when the first rigid member is subjected to the shocks and vibrations produced in the tire-and-wheel assembly, and an elastic member composed of at least two segments constructed independently of each other in at least one plane parallel with the direction in which the first and second rigid members are to be displaced with respect to each other, the segments of the elastic member being constructed of the same material and being similar in geometry.

4 Claims, 5 Drawing Figures

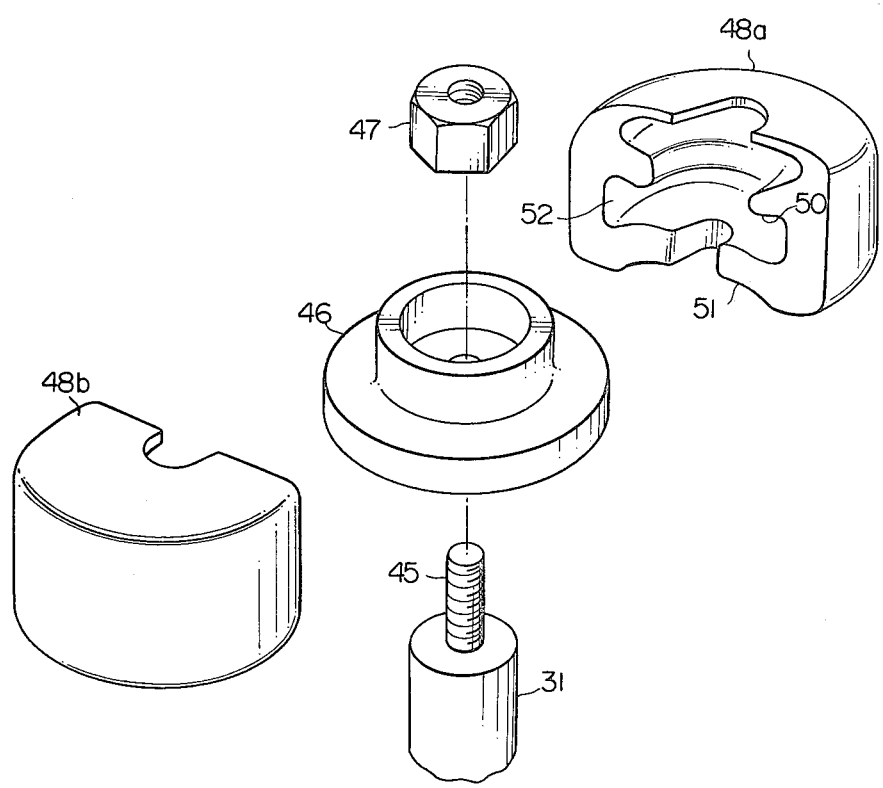

ELASTIC SUPPORT STRUCTURE OF WHEEL SUSPENSION MECHANISM

FIELD OF THE INVENTION

The present invention relates to an elastic support structure for a wheel suspension mechanism of a wheeled vehicle such as an automotive vehicle and, more particularly, to an elastic support structure of a strut-type independent wheel suspension mechanism for an automotive vehicle.

SUMMARY OF THE INVENTION

In accordance with the present invention, there is provided an elastic support structure for a wheel suspension mechanism of a wheeled vehicle having a body structure and a tire-and-wheel assembly suspended from the vehicle body structure by the wheel suspension mechanism, comprising a first rigid member to be subjected to shocks and vibrations produced in the tire-and-wheel assembly, a second rigid member to which shocks and vibrations may be transmitted from the first rigid member, the first and second rigid members being movable with respect to each other when the first rigid member is subjected to the shocks and vibrations produced in the tire-and-wheel assembly, and an elastic member composed of at least two segments constructed independently of each other in at least one plane substantially parallel with the direction in which the first and second rigid members are to be displaced with respect to each other, the segments of the elastic member being constructed of the same material and being substantially similar in geometry. In the elastic support structure thus constructed and arranged, the elastic member may have first and second portions which are elastically deformable to different degrees, the first portion being elastically deformable when the first and second rigid members are forced to move toward each other and the second portion being elastically deformable when the first and second rigid members are forced to move away from each other. The first portion of the elastic member is, preferably, less elastically deformable than the second portion of the elastic member. In this instance, the elastic support structure according to the present invention may further comprise a third rigid member secured to the first rigid member, the first and second portions of the elastic member being spaced apart from each other by and across the third rigid member. The elastic support structure may further comprise a fourth rigid member, one of the first and fourth rigid members having an externally threaded portion and the other of the first and fourth rigid members having an internally threaded portion, the third rigid member being secured to the first rigid member by mating engagement between the aforesaid externally threaded portion and aforesaid internally threaded portion. The first rigid member may be connected to the tire-and-wheel assembly and movable with respect to the vehicle body structure and the second rigid member may form part of the vehicle body structure. In this instance, the first rigid member is preferably constituted by a portion of a suspension strut assembly including a fluid-operated shock absorber.

BRIEF DESCRIPTION OF THE DRAWINGS

The drawbacks of a prior-art elastic support structure of a strut-type independent wheel suspension mechanism and the features and advantages of a elastic support structure according to the present invention will be more clearly understood from the following description taken in conjunction with the accompanying drawings in which:

FIG. 4 is an exploded perspective view showing members forming part of the elastic support structure shown in FIG. 3.

DESCRIPTION OF THE PRIOR ART

Figure 1:
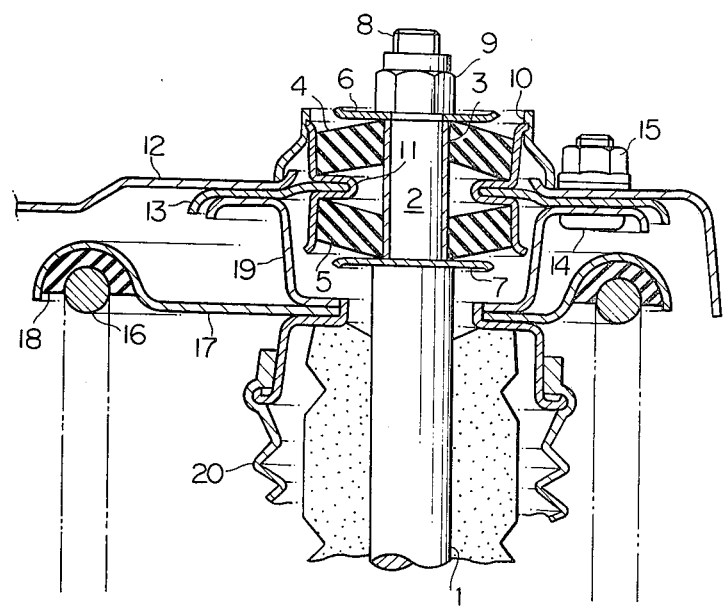
FIG. 1 is a sectional view of a prior-art elastic support structure of a wheel suspension mechanism for an automotive vehicle.

In FIG. 1 of the drawings, a prior-art elastic support structure of a wheel suspension mechanism is shown comprising a fluid-operated strut assembly including a cylinder body (not shown) and a piston rod 1 extending upwardly from the cylinder body. The piston rod 1 has a reduced upper end portion 2 received in a tubular collar 3. The tubular collar 3 has carried thereon annular upper and lower elastic members 4 and 5 which are formed with central openings in which the collar 3 has its opposite axial end portions fitted. The reduced upper end portion 2 of the piston rod 1 has further carried thereon annular upper and lower retainer discs 6 and 7 attached to the opposite end faces of the collar 3 and thereby have the elastic members 4 and 5 axially held in position therebetween. The reduced upper end portion 2 of the piston rod 1 is in part threaded as at 8 and has fitted thereon a nut 9 securing the upper retainer disc 6 to the collar 3. The upper and lower elastic members 4 and 5 are axially spaced apart from each other by a rigid bracket member 10 having an annular rib portion 11 closely interposed between the elastic members 4 and 5. The bracket member 10 further has inner peripheral surface portions on which the upper and lower elastic members 4 and 5 are resiliently received along their outer peripheral surfaces, respectively. The bracket member 10 is securely attached to a structural member 12 of a vehicle body structure by means of a retainer plate 13 welded to the bracket member 10 and fastened to the structral member 12 by a bolt 14 and a nut 15. A helical compression spring 16 is seated at one end thereof an upper spring seat plate 17 with a resilient annular spring seat element 18 interposed therebetween. The spring seat plate 17 is securely connected to the structural member 12 of the vehicle body structure by means of a rigid connecting member 19 partically welded to the spring seat plate 17 and partly attached to the above mentioned retainer plate 13 by the head portion of the bolt 14. Though not shown in the drawings, the helical compression spring 16 is seated at the other end thereof a lower spring seat plate secured to the cylinder body of the strut assembly. The cylinder body of the strut assembly in turn is coupled at its lower end to a wheel axle assembly through a knuckle joint and to the transverse link member of the suspension mechanism through a ball-and-socket joint, though not shown either. Designated by reference numeral 20 is a bellows-shaped dust cover attached at one end thereof to the cylinder body of the strut assembly though not shown in the drawings and at the other end thereof to the above mentioned spring seat plate 17.

In the prior-art elastic support structure constructed and arranged as described above, the upper and lower elastic members 4 and 5 are similar in geometry and are constructed of materials respectively having different coefficients of elasticity selected to provide stability of steering and to shield the vehicle body structure from the noises and vibrations produced in the road wheels. In this instance, the respective coefficients of elasticity of the elastic members 4 and 5 are selected in such a manner that the coefficient of elasticity of the upper elastic member 4 is smaller than that of the lower elastic member 5. The coefficients of elasticity effective in the elastic support structure when the associated road wheel encounters a jounce on a road surface with the body structure of the vehicle forced downwardly toward the road wheel are, for this reason, smaller than the coefficients of elasticity effective when the road wheel encounters a rebound on a road surface with the vehicle body structure of the vehicle forced downwardly toward the road wheel. When the vehicle encounters a jounce on a road surface, the upper elastic member 4 is forced to axially slide on the collar 3 toward the lower retainer disc 7, viz., downwardly with respect to the vehicle body structure while the lower elastic member 5 is compressed axially between the lower retainer disc 7 and the rib portion 11 of the rigid bracket member 10, as a consequence of the relative displacement between the sprung and unsprung weights of the vehicle. When, on the other hand, the vehicle encounters a rebound on a road surface, the lower elastic member 5 is forced to axially slide on the collar 3 toward the upper retainer disc 6, viz., upwardly with respect to the vehicle body structure while the upper elastic member 4 is compressed axially between the upper retainer disc 6 and the rib portion 11 of the rigid bracket member 10 secured to the vehicle body structure. In these manners, the energy causing a jounce of a road wheel is damped out by the axial displacement of the upper elastic member 4 and the elastic deformation of the lower elastic member 5 and, on the contrary, the energy causing a rebound of a road wheel is damped out by the the elastic deformation of the upper elastic member 4 and the axial displacement of the lower elastic member 5.

During assembly of the prior-art elastic support structure of the above described nature, it is thus important to distinguish the upper and lower elastic members 4 and 5 from each other so that the elastic members 4 and 5 incorporated in the support structure have proper coefficients of elasticity. A difficulty has however been experienced in properly distinguishing the upper and lower elastic members 4 and 5 from each other since the elastic members 4 and 5 are similar in shape as above discussed. Such a difficulty could be eliminated if the upper and lower elastic members 4 and 5 are shaped differently from each other. For this purpose, however, it becomes necessary to use two different types of molding units to fabricate such resilient members. This apparently gives rise to an increase in the production cost of the elastic support structure as a whole. The present invention contemplates solution of these problems in a conventional elastic support structure of a strut-type independent wheel suspension mechanism of the described general nature.

DESCRIPTION OF THE PREFERRED EMBODIMENTS

Figure 2:
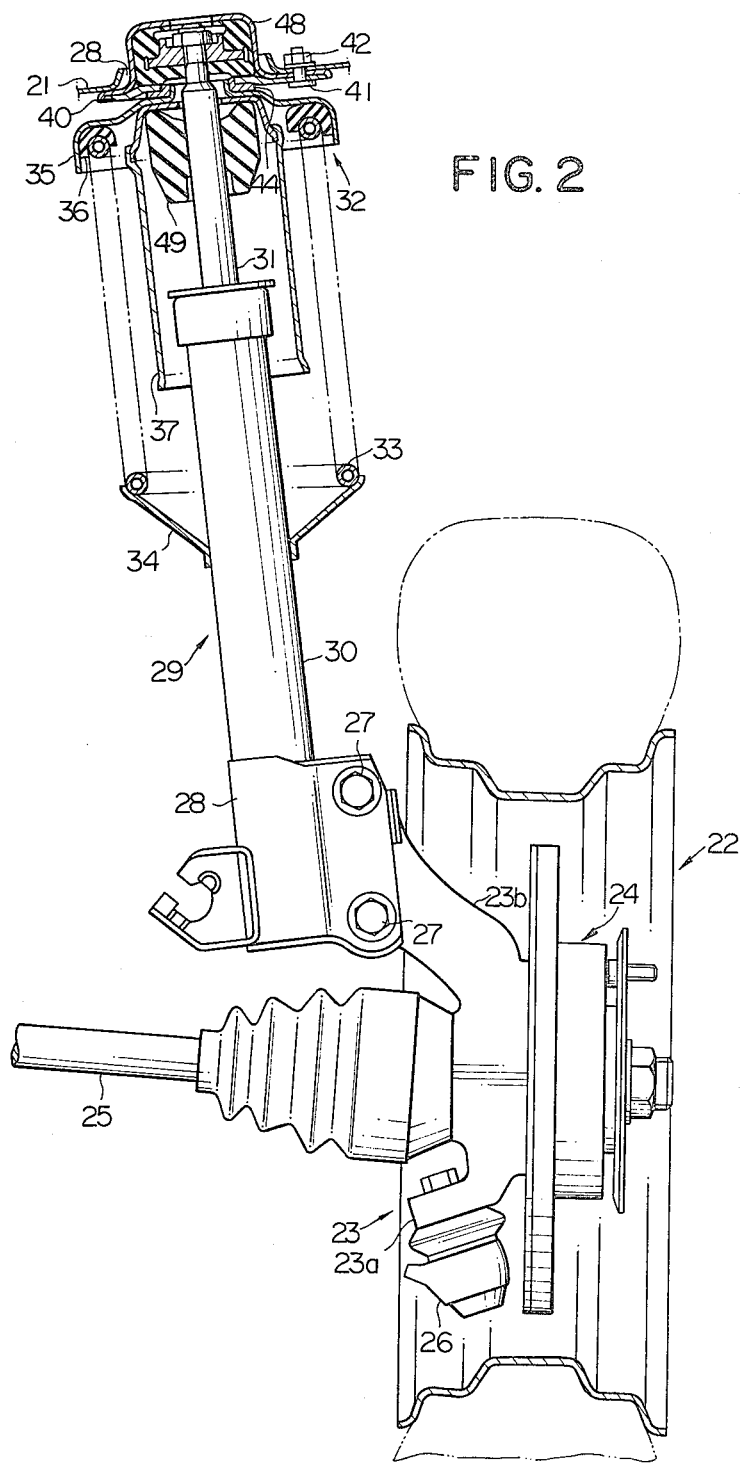
FIG. 2 is an elevation view showing, partly in section, part of a strut-type independent wheel suspension mechanism including a preferred embodiment of an elastic support structure according to the present invention.

Referring to FIG. 2 of the drawings, a strut-type independent wheel suspension mechanism of an automotive vehicle is shown intervening between a suitable structural member 21 of the vehicle body structure and a tire-and-wheel assembly 22 of the vehicle. The suspension mechanism herein shown is one of the right and left wheel suspension mechanisms respectively arranged in conjunction with the two front or rear tire-and-wheel assemblies of the vehicle and, thus, the other of the two suspension mechanisms is a symmetrical version of the shown suspension mechanism.

The wheel suspension mechanism shown in FIG. 2 comprises a knuckle joint 23 having a spindle portion (not shown) journaled in bearings (not shown) on a wheel axle 24 carrying the tire-and-wheel assembly 22. The wheel axle 24 is connected to an axle shaft 25 extending in a lateral direction of the vehicle body structure. The knuckle joint 23 further has lower and upper arm portions 23a and 23b projecting inwardly in lateral directions of the vehicle body structure away from the wheel axle 24. The lower arm portion 23a of the knuckle joint 23 is connected by a ball-and-socket joint 26 to a transverse link member (not shown) longitudinally extending in a lateral direction of the vehicle body structure. As well known in the art, the transverse link member thus connected at the laterally outer end thereof to the knuckle joint 23 is in turn connected at the laterally inner end thereof to a lower structural member of the vehicle body structure, though not shown in the drawings. The knuckle joint 23 is thus pivotally and rockably connected to the transverse link member which is pivotally connected to the vehicle body structure. On the other hand, the upper arm portion 23b of the knuckle joint 23 is securely connected by bolts 27 and a bracket member 28 to a vertically extending suspension strut assembly 29 having a direct-acting, fluid-operated shock absorber incorporated therein. The strut assembly 29 has a cylinder body 30 having a lower end portion welded or otherwise securely connected to the bracket member 28 and a piston rod 31 rockably connected at the upper end thereof to a strut mounting assembly 32 secured to the above mentioned structural member 21 of the vehicle body structure. The strut assembly 29 is designed to be capable of absorbing shocks more during jounce than during rebound of the associated road wheel of the vehicle. In an elastic support structure according to the present invention, the piston rod 31 of the strut assembly 29 as above described constitutes a first rigid member to be subjected to shocks and vibrations produced in the tire-and-wheel assembly 22. On the other hand, the structural member 21 of the vehicle body structure constitutes a second rigid member to which shocks and vibrations may be transmitted from the first rigid member, viz., the piston rod 31 of the strut assembly 29. During jounce of the tire-and-wheel assembly 22, these first and second rigid members are forced to move toward each other and, during rebound of the tire-and-wheel assembly 22, the first and second rigid members are forced to move away from each other.

In the elastic support structure embodying the present invention, the strut mounting assembly 32 comprises a helical compression spring 33 axially extending in such a manner as to enclose therewithin the piston rod 31 and an upper portion of the cylinder body 30 of the strut assembly 29. The compression spring 33 is seated at one end thereof on a generally funnel-shaped lower spring seat member 34 on the cylinder body 30 of the strut assembly 29 and at the other end thereof on a generally drum-shaped upper spring seat member 35. The lower spring seat member 34 is welded or otherwise securely attached along its inner peripheral end to an intermediate axial portion of the cylinder body 30 of the strut assembly 29. The upper spring seat member 35 has an annular elastic element 36 received on the lower surface of its outer peripheral portion and the compression spring 33 is seated at the upper end thereof on this elastic element 36. The spring seat member 35 is received on the structural member 21 of the vehicle body structure in such a manner as to be rotatable with respect to the structural member 21 about the center axis of the piston rod 31 of the strut assembly 29 as will be described in more detail. The compression spring 33 thus provided between the vehicle body structure and the tire-and-wheel assembly 22 constantly bears the sprung weight of the vehicle and is caused to axially deform when the sprung weight is vertically displaced with respect to the unsprung weight of the vehicle. A tubular dust shield member 37 axially extends within an upper portion of the compression spring 33 and is secured at its upper end to the upper spring seat member 35.

Figure 3:
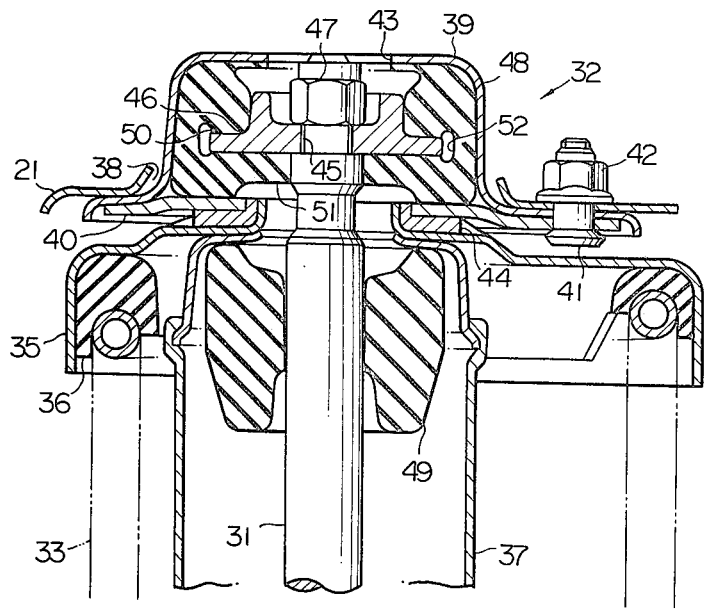
FIG. 3 is a sectional view showing, to an enlarged scale, the elastic support structure included in the wheel suspension mechanism shown in FIG. 2.

As will be better seen from FIG. 3 of the drawings, the structural member 21 of the vehicle body structure is formed with an opening 38 and allows the piston rod 31 of the strut assembly 29 to axially extend upwardly through the opening 38. A generally drum-shaped first retaining member 39 has a lower skirt portion surrounding the opening 38 in the structural member 21 and securely attached to a lower surface portion of the structural member 21 by suitable fastening means. The first retaining member 39 further has a generally cylindrical hollow casing portion axially protruding upwardly through the opening 38 in the structural member 21. The retaining member 39 has securely attached to the lower surface of its skirt portion a generally annular second retaining member 40 by the above mentioned fastening means. In the embodiment shown in FIGS. 2 and 3, the fastening means thus securing the first and second retaining members 39 and 40 comprises a bolt 41 axially passed through the second retaining member 40 and the skirt portion of the first retaining member 39 and engaged by a nut 42 tightly clamping the retaining members 39 and 40 to the structural member 21 as shown. The piston rod 31 of the strut assembly 29 axially extends upwardly into the casing portion of the first retaining member 39 through the opening in the second retaining member 40. The first retaining member 39 has formed in the upper end wall of its casing portion an opening 43 in which the piston rod 31 of the strut assembly 29 upwardly terminates. The casing portion of the first retaining member 39 and the opening in the second retaining member 40 have center axes coincident with the center axis of the piston rod 31 of the strut assembly 29. An annular bearing member 44 is attached to the lower surface of an inner peripheral portion of the second retaining member 40 and has the above mentioned upper spring seat member 35 slidably received on the lower surface thereof. The upper spring seat member 35 is in this manner permitted to turn with respect to the structural member 21 of the vehicle body structure about the center axis of the piston rod 31 of the strut assembly 29.

The strut mounting assembly 32 of the elastic support structure embodying the present invention further comprises main and auxiliary elastic members 48 and 49 carried on the piston rod 31 of the strut assembly 29. The main elastic member 48 is composed of a generally cylindrical, hollow block of a resilient material such as rubber and is retained in the casing portion of the first retaining member 39 by and in coaxial relationship to an upper end portion of the piston rod 31 of the strut assembly 29. For this purpose, the piston rod 31 of the strut assembly 29 has an externally threaded upper end portion 45 carrying a centrally apertured, generally disc-shaped spacer element 46 secured to the piston rod 31 by an internally threaded member such as a nut 47 and having a center axis coincident with the center axis of the piston rod 31. In the elastic support structure according to the present invention, the spacer element 46 constitutes a third rigid member which is secured to the first rigid member constituted by the piston rod 31 of the strut assembly 29, while the nut 47 constitutes a fourth rigid member having the third rigid member secured to the first rigid member by mating engagement between the first and fourth rigid members.

As will be better seen from FIG. 4 of the drawings, the main elastic member 48 consists of pair of independent segments 48a and 48b which are constructed independently of each other in a plane passing through the center axis of the piston rod 31 of the strut assembly 29. These two segments 48a and 48b of the elastic member 48 are formed of the same material and are similar in geometry, thus having equal coefficients of elasticity. Although the main elastic member 48 in the embodiment of the present invention is thus assumed to be composed of the two segments 48a and 48b, the main elastic member 48 in the elastic support structure according to the present invention may consists of three or more independent segments which are constructed separately of one another across planes containing or otherwise parallel with the center axis of the piston rod 31 of the strut assembly 29. Furthermore, the main elastic member 48 as a whole has a cylindrical peripheral wall portion formed with annular first and second or lower and upper internal rib portions 50 and 51 which radially project inwardly from the peripheral wall portion. The upper and lower rib portions 50 and 51 are spaced apart substantially in parallel from each other and have an annular groove 52 formed therebetween. The spacer element 46 is closely received in this annular groove 52 in the main elastic member 48, which thus has its first rib portion 50 closely fitted and resiliently deformed between the spacer element 46 and the end wall of the casing portion of the first retaining member 39 closely fitted and resiliently deformed between the spacer element 46 and the second retaining member 40 and its second rib portion 51. Thus, the upper or first rib portion 50 of the main elastic member 48 is adapted to be axially compressed during jounce of the tire-and-wheel assembly 22 (FIG. 2) while the lower or second rib portion 51 of the elastic member 48 is adapted to be axially compressed during rebound of the tire-and-wheel assembly 22. The auxiliary elastic member 49 is bonded or otherwise secured to an axial portion of the piston rod 31 of the strut assembly 29 and is located to be held in resiliently pressing engagement with the structural member 21 of the vehicle body structure through the upper spring seat member 35, bearing member 44 and first and second retaining members 39 and 40 as shown in FIGS. 2 and 3.

To install on the vehicle body structure the strut mounting assembly 32 constructed and arranged as hereinbefore described, the spacer element 46 is first fitted to the threaded end portion 45 of the piston rod 31 of the strut assembly 29 and is thereafter secured to the piston rod 31 by means of the nut 47. Thereupon, the two or more segments to construct the main elastic member 48 are fitted to the spacer element 46 in such a manner that the spacer element 46 is received in the annular groove 52 between the upper and lower rib portions 50 and 51 of the elastic member 48. The elastic member 48 thus fitted to the spacer element on the piston rod 31 of the strut assembly 29 is then enclosed within the casing portion of the first retaining member 39 with the second retaining member 40 attached to the lower surface of the skirt portion of the retaining member 39 and to the lower surface of the elastic member 48. At this time, the first and second retaining members 39 and 40 are secured to the structural member 21 of the vehicle body structure by the bolt 41 and the nut 42 in such a manner that the casing portion of the retaining member 39 protrude upwardly from the structural member 21 through the opening 38 in the structural member 21. The strut mounting assembly 32 of the elastic support structure embodying the present invention can thus be installed on the vehicle body structure easily and by a reduced number of steps since the upper and lower rib portions 50 and 51 to be responsive to jounce and rebound, respectively, of the tire-and-wheel assembly 22 are constructed commonly by the two or more segments of the elastic member 48.

Figure 5:
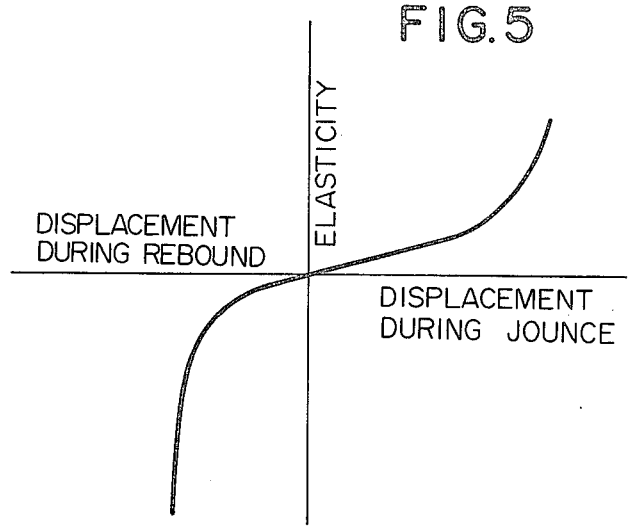
FIG. 5 is a graph showing the elasticity characteristic exhibited by the elastic support structure embodying the present invention.

The upper and lower rib portions 50 and 51 of the main elastic member 48 are shaped to have different thicknesses and are thus elastically deformable to different degrees. In the elastic support structure embodying the present invention, the thicknesses of the rib portions 50 and 51 of the elastic member 48 are selected so that the upper rib portion 50 responsive to jounce is thicker than the lower rib portion 51 responsive to rebound and, accordingly, the upper rib portion 50 is less elastically deformable than the second rib portion 51. For this reason, the main elastic member 48 exhibits a coefficient of elasticity which is larger in response to rebound than in response to jounce of the tire-and-wheel assembly 22 as will be seen from the characteristic curve shown in FIG. 5 of the drawings. During jounce of the tire-and-wheel assembly 22, the body structure of the vehicle is forced downwardly toward the tire-and-wheel assembly 22. Under these conditions, the upper rib portion 50 of the main elastic member 48 is resiliently compressed and deformed between the spacer element 46 and the end wall of the casing portion of the first retaining member 39 and concurrently the lower rib portion 51 is forced downwardly away from the spacer element 46. The downward displacement of the vehicle body structure with respect to the tire-and-wheel assembly 22 is thus taken up in major proportion by the upper or first rib portion 50 of the elastic member 48 during jounce of the tire-and-wheel assembly 22. The upper rib portion 50 is less elastically deformable than the lower rib portion 51 as above noted and is, for this reason, further capable of taking up minute displacements between the vehicle body structure and the tire-and-wheel assembly 22 and accordingly dampening the noises and vibrations transmitted from the tire-and-wheel assembly 22 to the vehicle body structure during jounce of the tire-and-wheel assembly 22. During rebound of the tire-and-wheel assembly 22, on the other hand, the body structure of the vehicle is forced upwardly away from the tire-and-wheel assembly 22. Under these conditions, the lower rib portion 51 of the main elastic member 48 is resiliently compressed and deformed between the spacer element 46 and the second retaining member 40 and concurrently the upper rib portion 50 is forced upwardly away from the spacer element 46. The upward displacement of the vehicle body structure with respect to the tire-and-wheel assembly 22 is thus taken up in major proportion by the lower or second rib portion 51 of the main elastic member 48 during rebound of the tire-and-wheel assembly 22. The lower rib portion 51 is more elastically deformable than the upper rib portion 50 and is further capable of restricting axial displacement of the piston rod 31 of the strut assembly 29 with respect to the vehicle body structure during rebound of the tire-and-wheel assembly 22. This adds to the shock and vibration dampening abilities of the wheel suspension mechanism as a whole and improves the stability of steering. Furthermore, provision of the main elastic member 48 around the nut 47 on the piston rod 31 is conducive to reduction of the length of the piston rod 31 and accordingly the total effective length of the strut assembly 29, in contrast to the piston rod 1 in the prior-art elastic support structure (FIG. 1) in which the elastic members 4 and 5 are provided in series with the nut 9 on the piston rod 1. It is further pointed out that deterioration of the elastic member 48 as would be caused by production of cracks therein is minimized since the elastic member 48 is not bonded to the spacer element 46 but is simply fitted thereto by means of the nut 47.

What is claimed is:

1. An elastic support structure for a wheel suspension mechanism of a wheeled vehicle having a body structure and a tire-and-wheel assembly suspended from the vehicle body structure by the wheel suspension mechanism, comprising a first rigid member to be subjected to shocks and vibrations produced in the tire-and-wheel assembly, a second rigid member to which shocks and vibrations may be transmitted from the first rigid member, the first and second rigid members being movable with respect to each other when the first rigid member is subjected to the shocks and vibrations produced in the tire-and-wheel assembly, an elastic member composed of at least two segments constructed independently of each other in at least one plane substantially parallel with the direction in which the first and second rigid members are to be displaced with respect to each other, said segments being contructed of the same material and being substantially similar in geometry, said elastic member consisting of first and second portions which are elastically deformable to different degrees, the first portion being elastically deformable when said first and second rigid members are forced to move toward each other and the second portion being elastically deformable when the first and second rigid members are forced to move away from each other, said first portion of the elastic member being less elastically deformable than the second portion of the elastic member, and a third rigid member secured to said second rigid member and intervening between said first and second portions of said elastic member, the first and second portions of the elastic member being in part spaced apart from each other by and across said third rigid member and in part integral with each other around said third rigid member.

2. An elastic support structure as set forth in claim 1, further comprising a fourth rigid member, one of the first and fourth rigid members having an externally threaded portion and the other of the first and fourth rigid members having an internally threaded portion, said third rigid member being secured to said first rigid member by mating engagement between said externally threaded portion and said internally threaded portion.

3. An elastic support structure as set forth in claim 1 or claim 2, in which said first rigid member is connected to said tire-and-wheel assembly and movable with respect to said vehicle body structure and in which said second rigid member forms part of the vehicle body structure.

4. An elastic support structure as set forth in claim 3, in which said first rigid member is constituted by a portion of a suspension strut assembly including a fluid-operated shock absorber.

* * * * *